(12) United States Patent
Triouleyre et al.

(10) Patent No.: US 8,318,823 B2
(45) Date of Patent: Nov. 27, 2012

(54) VISCO-ELASTIC POLYURETHANE FOAM

(75) Inventors: Sebastien Triouleyre, Köln (DE); Sven Meyer-Ahrens, Leverkusen (DE); Alice Mosbach-Rosenberger, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 85 days.

(21) Appl. No.: 12/809,297

(22) PCT Filed: Dec. 9, 2008

(86) PCT No.: PCT/EP2008/010416
§ 371 (c)(1),
(2), (4) Date: Sep. 27, 2010

(87) PCT Pub. No.: WO2009/080202
PCT Pub. Date: Jul. 2, 2009

(65) Prior Publication Data
US 2011/0034575 A1    Feb. 10, 2011

(30) Foreign Application Priority Data
Dec. 20, 2007  (DE) .......................... 10 2007 061 883

(51) Int. Cl.
*C08G 18/28*    (2006.01)
(52) U.S. Cl. .............. 521/137; 252/182.25; 252/182.27; 521/134; 521/159; 521/170; 521/174
(58) Field of Classification Search .................. 521/134, 521/137, 159, 170, 174; 252/182.25, 182.27
See application file for complete search history.

(56) References Cited

U.S. PATENT DOCUMENTS

| | | | |
|---|---|---|---|
| 3,304,273 A | 2/1967 | Stamberger | |
| 3,383,351 A | 5/1968 | Stamberger | |
| 3,523,093 A | 8/1970 | Stamberger | |
| 4,263,408 A | 4/1981 | Meyborg et al. | |
| 4,304,708 A | 12/1981 | Marx et al. | |
| 4,374,209 A | 2/1983 | Rowlands | |
| 5,420,170 A | 5/1995 | Lutter et al. | |
| 6,136,879 A | 10/2000 | Nishida et al. | |
| 6,204,300 B1 | 3/2001 | Kageoka et al. | |
| 6,506,813 B1 * | 1/2003 | Parfondry et al. ............ | 521/174 |
| 6,590,008 B1 | 7/2003 | Parfondry et al. | |
| 6,653,363 B1 | 11/2003 | Tursi, Jr. et al. | |
| 7,947,756 B2 * | 5/2011 | Andries et al. ................ | 521/174 |
| 2002/0165290 A1 | 11/2002 | Falke et al. | |
| 2008/0300335 A1 | 12/2008 | Gottke et al. | |

FOREIGN PATENT DOCUMENTS

| | | |
|---|---|---|
| DE | 1111394 | 7/1961 |
| DE | 1152536 | 8/1963 |
| DE | 1152537 | 8/1963 |
| DE | 1222669 | 8/1966 |
| DE | 2832253 | 1/1980 |
| DE | 3231497 | 3/1984 |
| DE | 60018745 | 2/2006 |
| DE | 102005058090 A1 | 6/2007 |
| EP | 0011752 | 6/1980 |
| EP | 0934962 | 6/2002 |
| GB | 969965 | 9/1964 |
| GB | 987618 | 3/1965 |
| GB | 1040452 | 8/1966 |
| WO | WO-00/73362 | 12/2000 |
| WO | WO-01/25305 | 4/2001 |
| WO | WO-01/32736 | 5/2001 |
| WO | WO-02/077056 | 10/2002 |
| WO | WO-02/088211 | 11/2002 |
| WO | WO-03/046041 | 6/2003 |

* cited by examiner

*Primary Examiner* — John Cooney
(74) *Attorney, Agent, or Firm* — Connolly Bove Lodge & Hutz LLP

(57) ABSTRACT

The invention relates to a polyether polyol composition for the preparation of polyurethane foams, comprising:
(a) a polyether polyol having a hydroxyl functionality of 2, an OH number within a range of from 50 to 65 mg of KOH/g and a proportion of primary hydroxyl groups within a range of from 40 to 80%, based on the total number of primary and secondary hydroxyl groups, having a PO content of from 45 to 55% by weight and an EO content of from 40 to 55% by weight;
(b) a dispersion of a polymer in a polyether polyol, wherein the OH number of the dispersion is within a range of from 10 to 30 mg of KOH/g and the polyether polyol has a hydroxyl functionality of 3, a proportion of primary hydroxyl groups within a range of from 70 to 90%, based on the total number of primary and secondary hydroxyl groups, a PO content of from 70 to 90% by weight and an EO content of from 10 to 30% by weight;
(c) a polyether polyol having a hydroxyl functionality of 3, an OH number within a range of from 220 to 290 mg of KOH/g and a proportion of primary hydroxyl groups within a range of at least 90%, based on the total number of primary and secondary hydroxyl groups, having a PO content of up to 2% by weight and an EO content of at least 75% by weight;
(d) a polyether polyol having a hydroxyl functionality of 2, an OH number within a range of from 50 to 70 mg of KOH/g and a proportion of primary hydroxyl groups within a range of from 0 to 3%, based on the total number of primary and secondary hydroxyl groups, having a PO content of at least 95% by weight and an EO content of up to 3% by weight.

24 Claims, 2 Drawing Sheets

VISCO-ELASTIC POLYURETHANE FOAM

Figure 1:
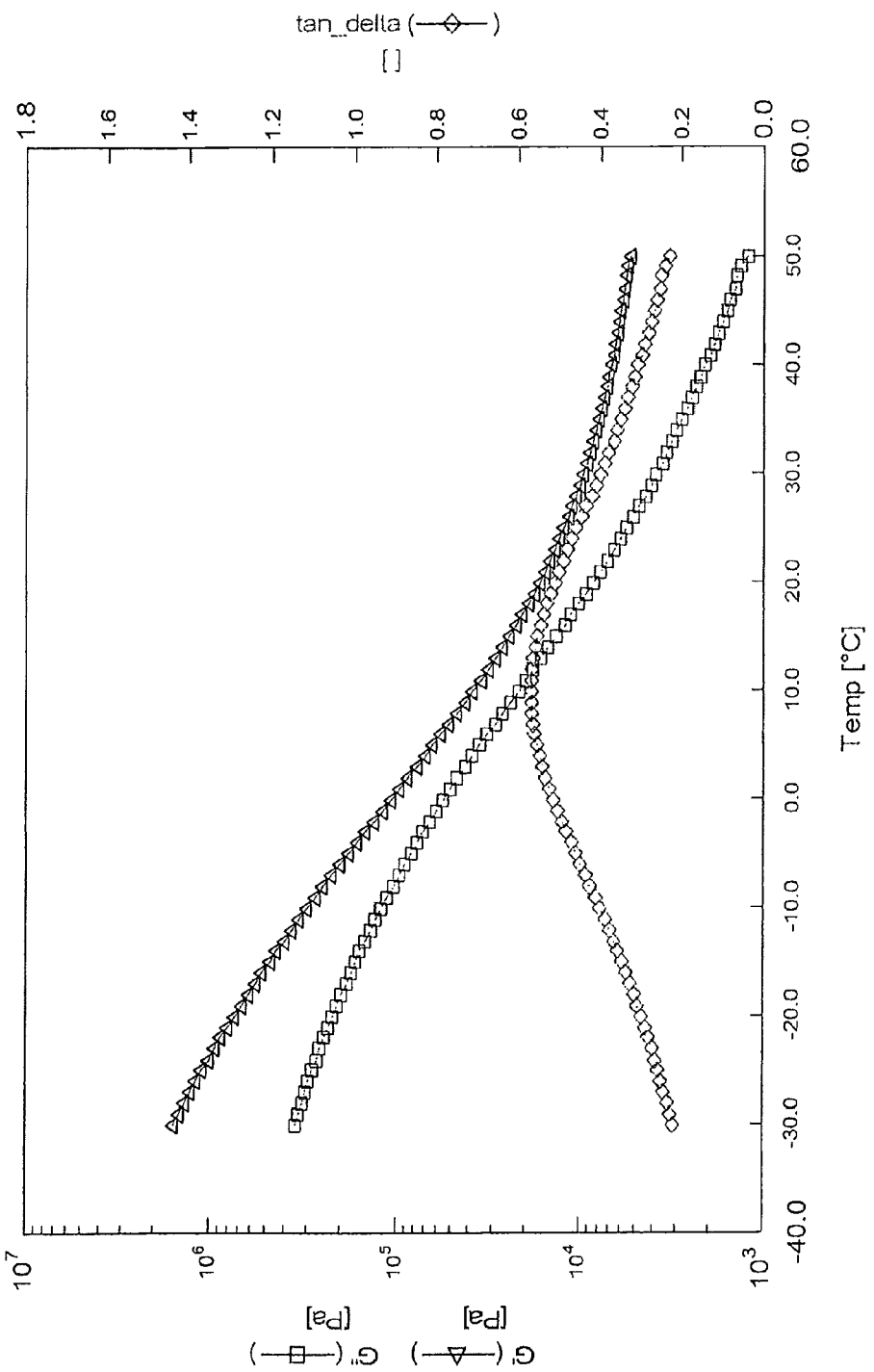

The present invention relates to polyether polyol compositions, a process for the preparation of visco-elastic polyurethane foams using such polyether polyol compositions, and correspondingly prepared visco-elastic foam materials and the use thereof.

Visco-elastic foams are characterized by a slow and gradual recovery after compression. Such materials are well known in the prior art and are much appreciated because of their energy-absorbing properties. Visco-elastic foam materials are found in a wide variety of application fields for cushioning (such as in pillows, seat covers, mattresses etc.), as sound and/or vibration damping materials or as an impact protection.

Among the visco-elastic foam materials, those made of polyurethanes are certainly most important. On the one hand, this is because some physical properties of the polyurethane foam to be obtained can be adjusted very precisely by selecting the polyol and isocyanate components employed and optionally further auxiliaries, but on the other hand, it is also because foam materials of almost any shape and structure, which may be very complex, can be prepared by "in situ" preparation (optionally on the site).

In the preparation of polyurethanes, two or more liquid streams are usually combined. The mixing of such liquid streams initiates polymerization and, for foams, the foaming of the polymerizing material. Polymerization and shaping are often effected in one step, typically by shaping or spraying the reaction mixture while still in the liquid state. In addition, polyurethanes are also often prepared in the form of slabstock, which is subsequently cut to the desired shape.

In most cases, the above mentioned liquid streams are, on the one hand, a polyfunctional organic isocyanate component (often referred to as "component A") and, on the other hand, polyfunctional monomers or resins which have an appropriate reactivity towards isocyanates and may optionally contain further auxiliaries. The latter mixture, which is often referred to as "component B", typically comprises one or more polyol components for the major part thereof.

To obtain a polyurethane foam of a particular composition, the above described liquid streams are dosed correspondingly before being mixed. Usually, foaming is achieved by adding water to component B, which water reacts with the polyisocyanate of component A to form an amine and to release $CO_2$, which in turn functions as a blowing gas. Alternatively or additionally to the use of water, volatile inert organic compounds or inert gases are often used.

The majority of conventional polyurethane foams are block copolymers comprising spatially separated regions of different phases with high and low glass transition temperatures ($T_G$). The glass transition temperature separates the brittle energy-elastic range (=glass range) below from the soft entropy-elastic range (=rubber-elastic range) above. These high and low glass transition temperatures of different phases within the polymer normally set limits to the temperature range within which the material can be used. The DMA ("dynamic mechanical analysis") spectra of such materials are usually characterized by a relatively flat region ("modulus plateau") between the different glass transitions.

The phase of low glass transition temperature in such materials is usually (though not always) derived from a ""block"" of low glass transition temperature, which is formed first and subjected to polymerization only subsequently. In contrast, the phase of high glass transition temperature normally forms only during the polymerization due to the formation of urethane moieties which occurs then. The block of low glass transition temperature (often also referred to as "soft block") is usually derived from a liquid or from an oligomeric resin of low melting temperature that contain a large number of groups reactive towards isocyanate moieties. Polyether polyols and polyester polyols are examples of such oligomeric resins.

In conventional polyurethanes, the hard (high glass transition temperature) and soft (low glass transition temperature) phases arrange towards one another during polymerization and subsequently separate spontaneously to form morphologically different phases within the "bulk polymer". Accordingly, such materials are also referred to as "phase-separated" materials.

In this context, visco-elastic polyurethanes are a special case in a way, namely in which the above described phase separation occurs incompletely or not at all.

To be distinguished from such a "structural visco-elasticity" in polyurethane foams with (predominantly) open cells is a visco-elasticity that is due to a pneumatic effect. Namely, in the latter case, almost closed cells, i.e., cells with little opening, are within the foam material. Because of the small size of the openings, air will re-enter slowly after compression, which results in a slowed-down recovery.

Examples of such a visco-elastic foam based on a pneumatic effect are the commercially available products Cosypur® and Elastoflex® of the Elastogran GmbH.

In the prior art, many methods have been described for the synthesis of polyurethane foams with structural visco-elasticity, which methods mostly share the use of a special polyether polyol composition in addition to an isocyanate component that is more or less freely selectable.

Such polyether polyols are usually the product of the polymerization of epoxides, such as ethylene oxide (EO), propylene oxide (PO), butylene oxide, styrene oxide or epichlorohydrin, with themselves or by addition of such epoxides, optionally in admixture or sequentially, to starting components with reactive hydrogen atoms, such as water, alcohols, ammonia or amines. Such ""starter molecules"" usually have a functionality of from 1 to 6. Depending on the process control, such polyether polyols may be homopolymers, block copolymers, random copolymers, capped polymers or polymers tipped with a mixture of different epoxides. To specify such polyether polyols, various characteristics have become established in the prior art:

i.) hydroxyl functionality, which depends on the starter molecule starting from which the polyether polyol is synthesized;

ii.) hydroxyl or OH number, which is a measure of the content of hydroxyl groups stated in mg of KOH/g;

iii.) when epoxides in which the ring opening causes the formation of different (i.e., primary or secondary) hydroxyl groups are used, on the one hand, the proportion of the respective epoxides in the polyether polyol is stated, and on the other hand, the proportion of primary or secondary hydroxyl groups based on the total number of hydroxyl groups present in the polyether polyol is stated;

iv.) the molecular weight ($M_n$ or $M_w$), which is a measure of the length of the polyoxyalkylene chains of the polyether polyols.

The above mentioned quantities can be related to one another through the following equation: $56,100 = \text{OH number} \cdot (M_w/\text{hydroxyl functionality})$.

WO 01/32736 A1 describes a polyether polyol composition for preparing visco-elastic polyurethane foams that comprises the following components:

b1) a polyoxyethylene-polyoxypropylene polyol having an average hydroxyl functionality within a range of from 2 to 6, wherein the EO is tipped onto and/or randomly distributed in the polymer chain and the total EO content is at least 50% by weight;
b2) a polyoxyethylene-polyoxypropylene polyol having an average hydroxyl functionality within a range of from 2 to 6, wherein the EO is tipped onto and/or randomly distributed in the polymer chain and the total EO content is within a range of from 20 to 50% by weight and the proportion of primary hydroxyl groups is at least 50%, based on the total number of primary and secondary hydroxyl groups;
b3) a polyoxyethylene-polyoxypropylene polyol having an average hydroxyl functionality within a range of from 2 to 6, wherein the EO content is within a range of from 10 to 20% by weight and the proportion of primary hydroxyl groups is at least 50%, based on the total number of primary and secondary hydroxyl groups;
b4) a polyalkylene glycol having an average molecular weight within a range of from 100 to 1200;
the polyols b1, b2, b3 and b4 being contained in the following amounts, based on the total weight of all polyols b1, b2, b3 and b4: b1: 30-85% by weight; b2: 5-65% by weight; b3: 5-40% by weight; b4: 0-50% by weight.

The polyether polyol composition in WO 02/088211 A1 is essentially based on the composition described in WO 01/32736 A1, but comprises a polyoxyalkylene mono-ol with a molecular weight of at least 120 as a further component.

WO 02/077056 A1, WO 01/25305 A1 and U.S. Pat. No. 5,420,170 also describe different polyether polyol compositions for the preparation of visco-elastic polyurethane foams.

The fact that a phase separation is hardly or not at all present in (structurally) visco-elastic polyurethane foams (see above) is normally manifested by a single broad glass transition range whose temperature is typically within a range of from about 0 to about 50° C. This usually results in a strong dependence of the physical properties of the polyurethane foam on the ambient temperature.

Depending on the respective field of application, such a strong temperature dependence may be desired or undesirable.

Thus, U.S. Pat. No. 6,653,363 B1 describes visco-elastic polyurethane foams whose elasticity has a strong temperature dependence. Such foams are employed, for example, in the form of mattresses whose elasticity at the loaded sites increases due to the body heat and which thus exhibit an agreeable equilibrium between hardness and softness.

However, it may also be preferred if the physical properties of the polyurethane foams have a small temperature dependence. Thus, for example, it is very easy to imagine that such foams should be employed in seats of vehicles, because the ambient temperature of the seats can be subject to relatively large variations in this case (unlike mattresses, for example).

Accordingly, U.S. Pat. No. 6,136,879 A describes soft polyurethane foams whose elasticity has a small temperature dependence. This object is achieved essentially by the presence of a special polyoxyalkylene monool which is obtained from alkylphenols by polymerization with propylene oxide and/or ethylene oxide. However, nothing is said in this connection about the availability of visco-elastic polyurethane foams with a small temperature dependence of physical properties.

Therefore, it is the object of the present invention to provide visco-elastic polyurethane foams whose physical properties, especially elasticity, have a small temperature dependence.

In a first embodiment, the object of the present invention is achieved by a polyether polyol composition for use in a polyurethane composition comprising the following polyether polyols:
(a) a polyether polyol having a hydroxyl functionality of 2, an OH number within a range of from 50 to 65 mg of KOH/g and a proportion of primary hydroxyl groups within a range of from 40 to 80%, based on the total number of primary and secondary hydroxyl groups, having a PO content of from 45 to 55% by weight and an EO content of from 40 to 55% by weight;
(b) a dispersion of a polymer in a polyether polyol, wherein the OH number of the dispersion is within a range of from 10 to 30 mg of KOH/g and the polyether polyol has a hydroxyl functionality of 3, a proportion of primary hydroxyl groups within a range of from 70 to 90%, based on the total number of primary and secondary hydroxyl groups, a PO content of from 70 to 90% by weight and an EO content of from 10 to 30% by weight;
(c) a polyether polyol having a hydroxyl functionality of 3, an OH number within a range of from 220 to 290 mg of KOH/g and a proportion of primary hydroxyl groups within a range of at least 90%, based on the total number of primary and secondary hydroxyl groups, having a PO content of up to 2% by weight and an EO content of at least 75% by weight;
(d) a polyether polyol having a hydroxyl functionality of 2, an OH number within a range of from 50 to 70 mg of KOH/g and a proportion of primary hydroxyl groups within a range of from 0 to 3%, based on the total number of primary and secondary hydroxyl groups, having a PO content of at least 95% by weight and an EO content of up to 3% by weight.

The polyether polyols according to the invention can be prepared by the polymerization of epoxides, such as ethylene oxide, propylene oxide, butylene oxide, tetrahydrofuran, styrene oxide or epichlorohydrin, with themselves or by addition of such epoxides, optionally in admixture or sequentially, to starting components with reactive hydrogen atoms, such as water, alcohols, ammonia or amines.

Among the above mentioned epoxides, ethylene oxide and propylene oxide are particularly preferred.

The contents stated above for EO and PO relate to the (total) weight of the epoxides incorporated during the preparation of the polyether polyols. The weight of the starter molecules employed is left unconsidered.

If several epoxides are used for the synthesis of the polyether polyols, the latter can have any arrangement of the oxyalkylene moieties desired. Thus, they may correspondingly be homopolymers (if only one epoxide is used), copolymers, random copolymers, capped polymers or polymers tipped with a mixture of different epoxides to achieve a desired content of primary hydroxyl groups.

Preferably, the weight proportions of components (a) to (d) (optionally independently of one another) are as follows: (a) 40 to 60% by weight; (b) 10 to 30% by weight; (c) 5 to 20% by weight; and (d) 10 to 30% by weight. The indications in % by weight respectively relate to the total weight of the polyether polyol composition. These weight proportions are preferred because they result in a particularly small temperature dependence of the physical properties in the polyurethane foam according to the invention.

Component (b) of the polyether polyol composition according to the invention is a dispersion of a polymer.

Such dispersions are known as polymer-modified polyols and include polymer-modified polyether polyols, preferably graft polyether polyols, especially those based on styrene and/or acrylonitrile, which are advantageously obtained by in situ polymerization of styrene, acrylonitrile or preferably of mixtures of styrene and acrylonitrile (for example, at a weight ratio of from 90:10 to 10:90, especially from 70:30 to 30:70) in the above mentioned polyether polyols (by methods as described in the following patent specifications: DE 11 11 394, DE 12 22 669, DE 11 52 536, DE 11 52 537, U.S. Pat. No. 3,304,273, U.S. Pat. No. 3,383,351, U.S. Pat. No. 3,523, 093, GB 1040452, GB 987618, the entire contents of each of which are hereby incorporated herein by reference).

The above mentioned dispersions also include those obtained by the dispersion of, for example, polyureas, polyhydrazides, polyurethanes with tertiary amino groups and/or melamine in the polyether polyols (described, for example, in EP 0 011 752, U.S. Pat. No. 4,304,708, U.S. Pat. No. 4,374, 209, DE 32 31 497), the entire contents of each of which are hereby incorporated herein by reference). In the latter cases, the dispersions usually contain from 1 to 50% by weight of dispersed phase, preferably from 35 to 50% by weight.

The proportion of primary hydroxyl groups in component (a) is preferably from 50 to 70%, based on the total number of primary and secondary hydroxyl groups.

Possible starter compounds include, for example, dicarboxylic acids, such as succinic acid, adipic acid, phthalic acid and terephthalic acid.

As the starter compounds, for example, ammonia or aliphatic and/or aromatic amines, which may optionally be substituted, such as N-monoalkyl, N,N-dialkyl and/or N,N'-dialkyl substituted diamines, may also be used. They have at least one primary or secondary amino group, such as 1,2-diaminoethane, oligomers of 1,2-diaminoethane (for example, diethylenetriamine, triethylenetetramine or pentaethylenehexamine), 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane or aromatic amines obtained by acid-catalyzed condensation of aniline with formaldehyde. Further suitable starter molecules include alkanolamines, such as ethanolamine, N-methyl- and N-ethylethanolamine, dialkanolamines, such as diethanolamine, N-methyl- and N-ethyldiethanolamine, and trialkanolamines, such as triethanolamine.

Further suitable starter compounds are those having two or more hydroxyl groups, such as water, 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol, 1,2-hexanediol, 1,3-hexanediol, 1,4-hexanediol, 1,5-hexanediol, 1,6-hexanediol, glycerol, trimethylolpropane, pentaerythritol, sorbitol and sucrose, castor oil, modified soybean oil. The starter compounds may be used alone or as mixtures.

Polyether polyols that may be employed in polyol components (a) to (d) according to the invention have molecular weights within a range of from 150 to 12,500 g/mol, preferably within a range of from 500 to 6200 g/mol. Even more preferably, a 1,2-diol, especially propylene glycol, is used as a starter molecule in components (a) and (d). In components (b) and (c), triols are preferably used as starter molecules, preferably glycerol in the case of component (b), and preferably trimethylolpropane in the case of component (c).

Even more preferred examples of the above mentioned components (a) to (d) are the following (in part commercially available) products:

Component (a): Bayfit® VP PU 10WF04 Additive VP PU 49WB50;

Component (b): Hyperlite® Polyol E-852, Hyperlite® Polyol 1650; The polyether polyol component contained in component (b) may be Arcol® E-648-X, for example;

Component (c): Desmophen® VP PU 14791592, Desmophen® VP PU 1657;

Component (d): Desmophen® 3600 Z, Desmophen® 2060 BD.

In a second embodiment, the one object of the present invention is achieved by a process for preparing a viscoelastic foam characterized in that A) a polyisocyanate component;
B) a polyether polyol composition according to the invention;
C) and optionally water, one or more catalysts are reacted optionally with the addition of further auxiliaries, fillers and/or blowing agents.

According to the invention, the term "water" in this context also includes water-releasing complexes, adducts and inclusion compounds. In this connection, free water is preferred, which may be contained in an amount within a range of from 0 to 10% by weight, preferably in an amount within a range of from 0.5 to 3% by weight, based on polyether polyol component B.

As said blowing agents to be optionally included, the blowing agents usually employed for the foaming of polyurethane foams are used. Examples of blowing agents are alkanes, such as n-pentane, iso-pentane, mixtures of iso- and n-pentanes, cyclopentane, cyclohexane, mixtures of butane isomers and the mentioned alkanes, halogenated compounds, such as dichloromethane, dichloromonofluoromethane, difluoromethane, trifluoromethane, difluoroethane, 1,1,1,2-tetrafluoroethane, tetrafluoroethane (R 134 and R 134a), 1,1,1, 3,3,3-hexafluoropropane (R 356), 1,1,1,3,3-pentafluoropropane (R 245fa), chlorodifluoroethane, 1,1-dichloro-2,2,2-trifluoroethane, 2,2-dichloro-2-fluoroethane, heptafluoropropane and sulfur hexafluoride and carbon dioxide.

Preferably, carbon dioxide, cyclopentane, n-pentane and iso-pentane are employed singly or in admixture, optionally mixed with water. Further suitable blowing agents include carboxylic acids, such as formic acid, acetic acid, oxalic acid and chemical blowing agents that release gases in the course of the foaming process, such as azo compounds. Preferably, such blowing agents are employed in combination with water.

As said auxiliaries and additives to be optionally included, paraffins, paraffin oil, fatty alcohols or dimethylpolysiloxanes as well as pigments or dyes, stabilizers against ageing and weathering effects, plasticizers (such as dioctyl phthalate, distearyl phthalate, diisodecyl phthalate, dioctyl adipate, tricresyl phosphate, triphenyl phosphate and others) as well as fungistatically and bacteriostatically active substances and fillers, such as barium sulfate, kieselguhr, carbon black, precipitated chalk, glass fibers, LC fibers, glass flakes, glass beads, aramide or carbon fibers may be included. Further examples of possible foam stabilizers, flame-retardant substances, surface-active substances and fillers can be found in U.S. 2002/0165290 A1, the entire contents of which are hereby incorporated herein by reference, especially in paragraphs [0033], [0034] and [0058]-[0062].

The auxiliaries and additives mentioned above may be admixed to one or more components and may also be inserted in a mold that is optionally employed.

For the preparation of the foams according to the invention, catalysts that accelerate the reaction between the polyol component B and the isocyanate component A are optionally employed. Examples of suitable catalysts include organotin compounds, such as tin(II) salts of organic carboxylic acids, for example, tin(II) acetate, tin(II) octoate, tin(II) ethylhexoate and tin(II) laurate, and the dialkyltin(IV) salts, for example, dibutyltin diacetate, dibutyltin dilaurate, dibutyl tin maleate and dioctyltin diacetate. Further examples of suitable catalysts include amidines, such as 2,3-dimethyl-2,4,5,6-tetrahydropyrimidines and amines, such as triethylamine, tributylamine, dimethylcyclohexylamine, dimethylbenzylamine, pentamethyldiethylenetriamine, N,N,N',N'-tetramethylbutanediamine and -ethanediamine, N-methylmorpholine, N-ethylmorpholine, N-cyclohexylmorpholine, N,N,N',N'-tetramethyl-1,6-hexanediamine, pentamethyldiethylenetriamine, tetramethylguanidine, tetramethyldiaminoethyl ether, bis(dimethylaminopropyl)urea, dimethylpiperazine, 1,2-dimethylimidazole, 1-azabi-cyclo[3.3.0]octane and preferably 1,4-diazabicyclo[2.2.2]octane, bis(dimethyl-aminoethyl)ether and tris(dialkylaminoalkyl)-s-hexahydrotriazine. Preferably, the catalyst component contains at least one aliphatic amine.

Also, aminoalcohols may be used as catalysts. Examples thereof include triethanolamine, triisopropanolamine, N-methyl- and N-ethyldiethanolamine, and dimethylethanolamine and diethanolamines. N-(dimethylaminoethyl)-N-methylethanolamine is preferred.

A combination of several catalysts may also be used.

In the process according to the invention, the amount of polyisocyanate component is preferably selected to have an isocyanate index within a range of from 70 to 110, more preferably within a range of from 80 to 100, since a very small temperature dependence of the foam obtained is achieved only within these narrow ranges.

In addition to (i.e., optionally in admixture with) ""simple"" polyisocyanate components, those obtained by a so-called prepolymerization of simple polyisocyanate components and organic compounds having at least one hydroxyl group may also be employed in the process according to the invention. Illustratively, there may be mentioned polyols or polyesters with one to four hydroxyl groups having molecular weights of from 60 to 6500. More preferably, those prepolymers which have been obtained by prepolymerization with the polyether polyol composition according to the invention are employed.

As the polyisocyanate component A, organic di- or polyisocyanates are used in the process according to the invention. As said di- or polyisocyanates, aliphatic, cycloaliphatic, araliphatic, aromatic and heterocyclic polyisocyanates as described in Justus Liebigs Annalen der Chemie 1949, 562, p. 75-136, may be used, for example, those of formula

wherein n is an integer of from 2 to 4, preferably 2; and
Q represents an aliphatic hydrocarbyl residue with from 2 to 18, preferably from 6 to 10, carbon atoms, a cycloaliphatic hydrocarbyl residue with from 4 to 15, preferably from 5 to 10, carbon atoms, an aromatic hydrocarbyl residue with from 8 to 15, preferably from 8 to 13, carbon atoms.

Polyisocyanates as described in DE-OS 28 32 253 are preferred. Polyisocyanates that are readily available technically, for example, 2,4- and 2,6-toluoylene diisocyanates and any mixtures of such isomers ("TDI"), polyphenyl polymethylene polyisocyanates as prepared by aniline-formaldehyde condensation followed by phosgenation ("MDI"), and polyisocyanates having carbodiimide groups, urethane groups, allophanate groups, isocyanurate groups, urea groups or biuret groups ("modified polyisocyanates"), especially those modified polyisocyanates which are derived from 2,4- and/or 2,6-toluoylene diisocyanate or from 4,4'- and/or 2,4'-diphenylmethane diisocyanate, are usually more preferably employed.

In particular, it has proven advantageous to employ MDI having a monomer content of from 75 to 85% by weight. The proportion of the MDI-2,4' isomer in the whole monomer content in the MDI is preferably from 8 to 35% by weight, more preferably from 15 to 25% by weight.

Especially MDI and the proportions of monomers or monomer isomers as described above have proven particularly advantageous in view of a small temperature resistance of physical properties.

The polyurethane foams according to the invention are to be included in the above described class of foams whose visco-elasticity is based on the particular structure of the polyurethane components. Thus, this is not pneumatic visco-elasticity. In a third embodiment, the yet other embodiments, an object of the invention is can be achieved by a visco-elastic foam obtainable by the process described above. Bodies of this visco-elastic foam having any shape desired can be prepared in situ in a way, for example, by reaction injection molding, or by cutting or punching from accordingly prepared polyurethane foam slabstock.

In a fourth embodiment, the additional other embodiments, an object of the invention iscan be achieved by the use of a body made of the a visco-elastic foam according to the invention in mattresses, pillows, seat covers, soles of shoes, earplugs, protective clothing, protective equipment or sound insulations.

EXAMPLES

The Bayfit®, Desmophen® and Hyperlite® polyols as well as the Desmodur® isocyanates are sold by the Bayer Materialscience AG; the Niax Silicone® L-6164 was purchased from the Momentive Performance Materials Inc., and the Addocat® catalysts were purchased from the Rhein Chemie Rhemian GmbH.

In a conventional slabstock foam machine, the following polyether polyol composition:

| | |
|---|---|
| Bayfit ® VP PU 10WF04 | 46.6 weight parts |
| Hyperlite ® Polyol 1650 | 20.0 weight parts |
| Desmophen ® VP PU 1657 | 10.0 weight parts |
| Desmophen ® 3600 Z | 23.4 weight parts |
| with the addition of 1.45 weight parts of water, and with the addition of the following auxiliaries | |
| Niax Silicone stabilizer L-6164 | 2.00 weight parts |
| Addocat ® 108 catalyst | 0.25 weight parts |
| Addocat ® 105 catalyst | 0.70 weight parts |
| with the use of | |
| Desmodur VP PU 10WB32 | 21.2 weight parts | as the polyisocyanate component was used to prepare a polyurethane foam according to the invention having the following physical properties:

| | |
|---|---|
| slab height: | 22 cm |
| bottom compaction: | 10/mm |
| air permeability (internal; after pressure application): | 350 mmWs |
| bulk density (according to DIN EN ISO 3386-1-98): | 70.8 kgm$^{-3}$ |
| tensile strength (according to DIN EN ISO 1798): | 36 kPa |
| elongation at break (according to DIN EN ISO 1798): | 125% |
| compression hardness 40% (1st loading): | 2.25 kPa |

| | |
|---|---|
| compression hardness 40% (4th loading): | 2.06 kPa |
| compression hardness 40% (37° C., 1st loading): | 2.34 kPa |
| compression hardness 40% (37° C., 4th loading): | 2.15 kPa |
| wet compression set (according to DIN EN ISO 1856-96): | |
| 0 value: | 1.1% |
| 22 h; 40° C.; 95% humidity: | 0.8% |

The small temperature dependence of the thus obtained foam material could be seen from an analysis of the related DMA spectrum (FIG. 1).

As can be seen from FIG. 1, when tan δ is plotted against temperature (in ° C.), the maximum observed in very broad and extends over a very wide range of temperatures.

Figure 2:
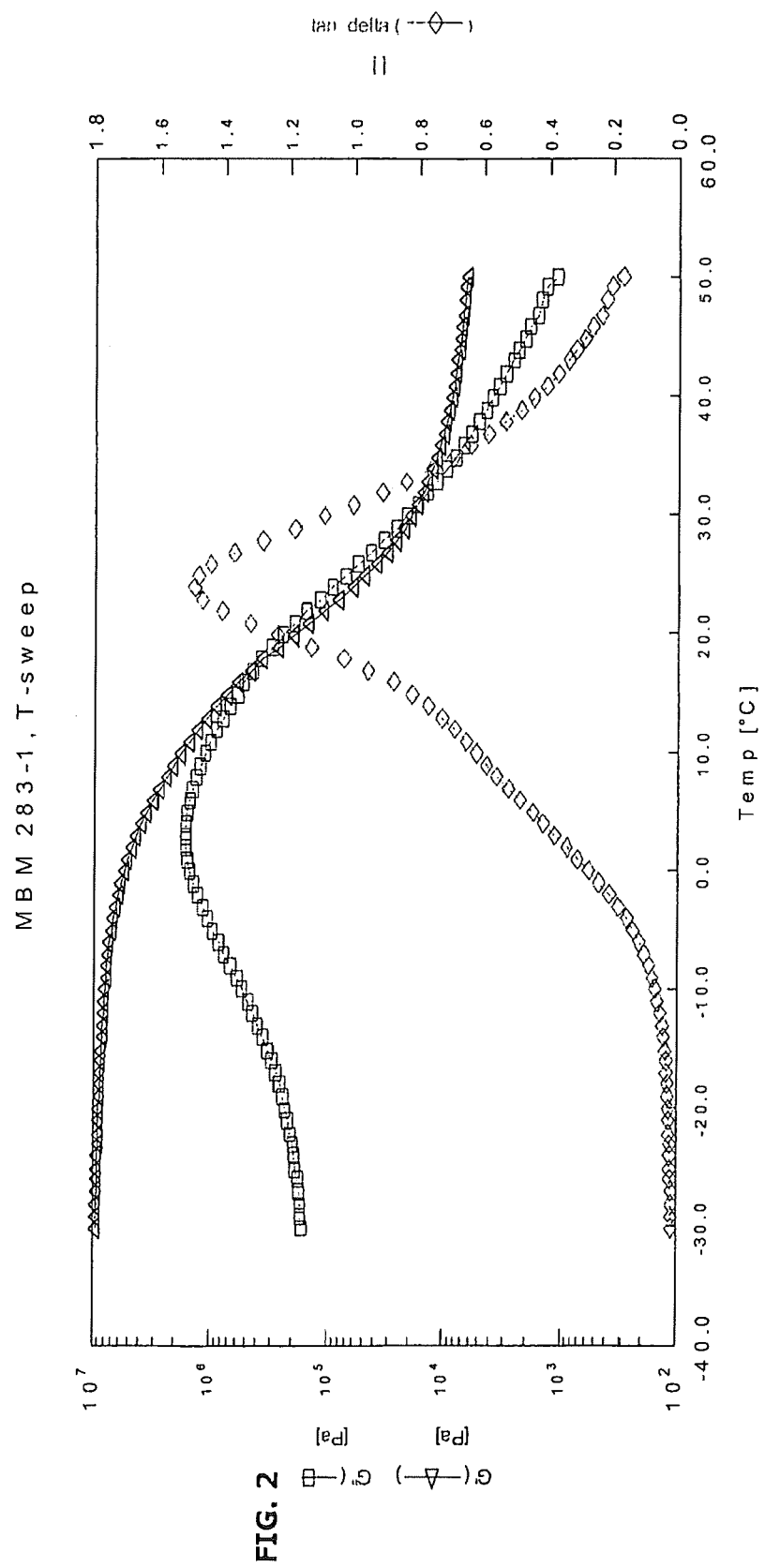

In contrast, FIG. 2 shows a diagram that belongs to a comparative example prepared with a polyol mixture having an average Mw of about 700 g/mol. The maximum that can be observed for tan δ is now substantially sharper and extends over a substantially narrower temperature range as compared to the example according to the invention.

The invention claimed is:

1. A polyether polyol composition comprising:
   (a) a first polyether polyol having a hydroxyl functionality of 2, an OH number of 50 to 65 mg of KOH/g, a proportion of primary hydroxyl groups within a range of from 40 to 80%, based on the a total number of primary and secondary hydroxyl groups, in the first polyether polyol, and having a PO content of from 45 to 55% by weight and an EO content of from 40 to 55% by weight;
   (b) a dispersion of a polymer in a second polyether polyol, wherein the OH number of the dispersion is within a range of from has an OH number of 10 to 30 mg of KOH/g, and wherein the second polyether polyol has a hydroxyl functionality of 3, a proportion of primary hydroxyl groups within a range of from 70 to 90%, based on the a total number of primary and secondary hydroxyl groups in the second polyether polyol, a PO content of from 70 to 90% by weight and an EO content of from 10 to 30% by weight;
   (c) a third polyether polyol having a hydroxyl functionality of 3, an OH number within a range of from 220 to 290 mg of KOH/g and, a proportion of primary hydroxyl groups within a range of at least 90%, based on the a total number of primary and secondary hydroxyl groups, in the third polyether polyol, and having a PO content of up to 2% by weight and an EO content of at least 75% by weight;
   (d) a fourth polyether polyol having a hydroxyl functionality of 2, an OH number within a range of from 50 to 70 mg of KOH/g and, a proportion of primary hydroxyl groups within a range of from 0 to 3%, based on the a total number of primary and secondary hydroxyl groups, in the fourth polyether polyol, and having a PO content of at least 95% by weight and an EO content of up to 3% by weight.

2. The composition according to claim 1, characterized in that the proportion of component (a) in the polyether polyol composition is from 40 to 60% by weight.

3. The composition according to either of claim 1 or 2, characterized in that the proportion of component (b) in the polyether polyol composition is from 10 to 30% by weight.

4. The composition according to claim 1, characterized in that the proportion of component (c) in the polyether polyol composition is from 5 to 20% by weight.

5. The composition according to claim 1, characterized in that the proportion of component (d) in the polyether polyol composition is from 10 to 30% by weight.

6. The composition according to claim 1, characterized in that the dispersed polymer in component (b) is a styrene-acrylonitrile polymer.

7. The composition according to claim 6, characterized in that the proportion of acrylonitrile in said styrene-acrylonitrile polymer dispersion is from present in an amount of 30 to 40% by weight.

8. The composition according to either of claim 6 or 7, characterized in that, the proportion of the polyether polyol in the dispersion is from 50 to 65% by weight.

9. The composition according claim 1, characterized in that the proportion of primary hydroxyl groups in component (a) is from 50 to 70%, based on the total number of primary and secondary hydroxyl groups.

10. The composition according to any of claim 1, characterized in that the polyether polyol of component (a) is derived from propylene glycol as the starting molecule.

11. The composition according to claim 1, characterized in that the polyether polyol of component (b) is derived from glycerol as the starting molecule.

12. The composition according to claim 1, characterized in that the polyether polyol of component (c) is derived from trimethylolpropane as the starting molecule.

13. The composition according to claim 1, characterized in that the polyether polyol of component (d) is derived from propylene glycol as the starting molecule.

14. A process for preparing a visco-elastic foam wherein
   A) a polyisocyanate component,
   B) a polyether polyol composition according to claim 1
   C) optionally water, one or more catalysts are reacted optionally with the addition of further auxiliaries, fillers and/or blowing agents.

15. The process according to claim 14, characterized in that the amount of the polyisocyanate component is selected to have an isocyanate index within a range of from 70 to 110, preferably within a range of from 80 to 100.

16. The process according to claim 1, characterized in that a polyisocyanate component obtained by prepolymerization is employed.

17. The process according to claim 16, characterized in that a polyether polyol composition according to any of claims 1 to 13 is employed in said prepolymerization.

18. The process according to claim 1, characterized in that the polyisocyanate component comprises MDI having a monomer content of from 75 to 85% by weight is employed.

19. The process according to claim 18, characterized in that a polyisocyanate component is employed whose proportion of MDI-2,4' isomer of the monomer content is from 8 to 35% by weight, preferably from 15 to 25% by weight.

20. A visco-elastic foam obtained by the process according to any of claims 14 to 19.

21. A shaped body comprising the visco-elastic foam according to claim 20.

22. The visco-elastic foam according to claim 20 in slabstock form.

23. Mattresses, pillows, seat covers, soles of shoes, earplugs, protective clothing, protective equipment or sound insulations comprising the shaped body according to claim 21.

24. Mattresses, pillows, seat covers, soles of shoes, earplugs, protective clothing, protective equipment or sound insulations comprising a cut portion of the slabstock foam according to claim 22.

* * * * *